United States Patent
Zhang et al.

(10) Patent No.: US 7,848,312 B2
(45) Date of Patent: Dec. 7, 2010

(54) METHOD AND SYSTEMS FOR TOLL-FREE INTERNET PROTOCOL COMMUNICATION SERVICES

(75) Inventors: Tao Zhang, Fort Lee, NJ (US); Miriam Tauil, Berkeley Height, NJ (US); Sunil Hukmichand Madhani, Edison, NJ (US); Prathima Agrawal, Auburn, AL (US); Toshikazu Kodama, Morristown, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 1551 days.

(21) Appl. No.: 11/007,868

(22) Filed: Dec. 9, 2004

(65) Prior Publication Data

US 2005/0147084 A1    Jul. 7, 2005

Related U.S. Application Data

(60) Provisional application No. 60/528,167, filed on Dec. 9, 2003.

(51) Int. Cl.
    *H04L 12/56* (2006.01)
(52) U.S. Cl. .................. 370/352; 370/229; 370/260; 379/207.04; 455/405; 455/411; 705/5; 709/201; 709/238; 709/245; 726/3
(58) Field of Classification Search .............. 370/352, 370/229, 260; 705/5; 726/3; 350/352; 379/207.04; 455/405, 411; 709/201, 238, 245
    See application file for complete search history.

(56) References Cited

U.S. PATENT DOCUMENTS 6,052,439 A * 4/2000 Gerszberg et al. ........ 379/88.01

6,181,690 B1 * 1/2001 Civanlar ................. 370/352

(Continued)

OTHER PUBLICATIONS

Calhoun, P.; Loughney, J.; Guttman, E.; Zorn, G.; Arkko, J. Diameter Base Protocol. IETF RFC 3588. pp. 1-138. Sep. 2003.

*Primary Examiner*—Gerald Gauthier
(74) *Attorney, Agent, or Firm*—Philip J. Feig

(57) ABSTRACT

This document describes Toll Free IP (TIP), a business model and its enabling methods to provide no-charge-to-user ("toll-free") connectivity through IP-based access networks (e.g., public wireless hotspot networks based on IEEE 802.11), which may be operated by different network operators. With TIP, the use of networks to communicate with a toll-free IP destination will be paid by the owner of the toll-free IP destination. A toll-free IP destination can be identified in many ways, e.g., by a toll-free IP address, toll-free Internet Domain Name, a toll-free Universal Resource Identifier or Universal Resource Locator. TIP enables a user to use networks without prior service subscriptions with network or service providers and without any special terminal software or hardware for gaining permission to use a network. It allows users to use more access networks, i.e., larger "footprints", than any individual network operator or aggregator can provide. With TIP, a service provider can provide services over IP-based access networks without the need to have business arrangements with each individual network operator or aggregator. TIP can also be used to enable other value-added services such as Prepaid IP, Collect IP, Selective Charging, and a single prepaid account across access networks of multiple operators or aggregators and even across wireless LANs (e.g., public hotspots and enterprise wireless LANs) and cellular networks.

15 Claims, 5 Drawing Sheets

U.S. PATENT DOCUMENTS

| | | | |
|---|---|---|---|
| 6,993,594 B2 * | 1/2006 | Schneider | 709/245 |
| 7,050,424 B2 * | 5/2006 | Cheng et al. | 370/352 |
| 7,065,043 B2 * | 6/2006 | Wu et al. | 370/229 |
| 7,069,291 B2 * | 6/2006 | Graves et al. | 709/201 |
| 7,079,527 B2 * | 7/2006 | Owens | 370/352 |
| 7,136,932 B1 * | 11/2006 | Schneider | 709/245 |
| 7,260,201 B2 * | 8/2007 | Jorasch et al. | 379/207.04 |
| 7,411,939 B1 * | 8/2008 | Lamb et al. | 370/352 |
| 7,467,225 B2 * | 12/2008 | Anerousis et al. | 709/238 |
| 7,522,907 B2 * | 4/2009 | Lupper et al. | 455/411 |
| 7,525,950 B1 * | 4/2009 | Zhang | 370/352 |
| 2002/0122391 A1 * | 9/2002 | Shalit | 370/260 |
| 2002/0147001 A1 * | 10/2002 | Newdelman et al. | 455/405 |
| 2003/0053443 A1 * | 3/2003 | Owens | 370/352 |
| 2003/0118004 A1 * | 6/2003 | Pan | 370/352 |
| 2004/0076144 A1 * | 4/2004 | Ishidoshiro | 370/352 |
| 2004/0179512 A1 * | 9/2004 | Leblanc et al. | 370/352 |
| 2004/0233893 A1 * | 11/2004 | Zhou et al. | 370/352 |
| 2005/0044243 A1 * | 2/2005 | Narayanan et al. | 709/229 |
| 2005/0063365 A1 * | 3/2005 | Mathew et al. | 370/352 |
| 2005/0114185 A1 * | 5/2005 | Rodriguez et al. | 705/5 |
| 2009/0031399 A1 * | 1/2009 | Kappes et al. | 726/3 |
| 2010/0128720 A1 * | 5/2010 | Goss | 370/352 |
| 2010/0135283 A1 * | 6/2010 | Burg | 370/352 |

* cited by examiner

METHOD AND SYSTEMS FOR TOLL-FREE INTERNET PROTOCOL COMMUNICATION SERVICES

CROSS REFERENCE TO RELATED APPLICATION

This application claims the benefit of priority of U.S. provisional application No. 60/528,167 filed on Dec. 9, 2003, entitled "System and Method for Toll-Free Internet Protocol."

FIELD OF THE INVENTION

The present invention relates generally to providing no-charge-to-user ("toll-free") connectivity through IP-based access networks which may be operated by different network operators.

BACKGROUND

IP-based access networks, such as wireless local area networks using IEEE 802.11, are being deployed rapidly worldwide in homes, enterprises, and public "hotpots" (e.g., airports, hotels, café shops, train stations, gas stations, parks, and along streets and highways). Higher-speed and longer-range wireless IP access networks, such as IEEE 802.16, are emerging.

Today, users have two basic ways to gain permission to use an IP access network. The first approach requires a user to have a service subscription with an access network or service provider. Before a user is allowed to use an access network, he/she needs to use the protocols, software and access control interfaces and procedures mandated by the network or service provider to communicate his/her identity, credentials, and service requests to a policy decision point (e.g., an authentication and authorization server) in the network, which uses the user's service subscription information to authenticate the user and authorize his/her use of a particular access network. To use networks of multiple providers, a user needs to maintain a service subscription with each network provider. A service provider can establish roaming agreements with other service or network providers so that its subscribers can use other providers' networks without multiple service subscriptions. This, however, is often hard to do in public hotspot markets, where there are many network and service providers each serving a small footprint.

The second existing approach is for the network to request a user to pay for network usage when the user attempts to use the network. It does not require a user to have a service subscription. Instead, a user's attempts to use the network (e.g., user's outgoing packets) are intercepted (trapped) by the network. The network redirects the trapped traffic to an AAA (Authentication, Authorization, and Accounting) server, which may be operated by a service provider separate from the access network providers. The AAA server prompts the user to agree to pay for network usage and to provide his/her credit card information before allowing the user to use the network. Different access networks may use different protocols, software, user interfaces, and authentication procedures to control network access (e.g., Web-based approaches, IEEE 802.1x, and proprietary solutions). A user terminal has to be equipped with these different protocols and software, and the user has to deal with these different interfaces and authentication procedures, to be able to use different networks.

The typical prior art IP network access system is depicted in FIG. 1. An Access Server 101 in the visiting access network 100 being visited by a user 102 receives traffic from the user and determines whether a user's traffic should be allowed to enter the portion of the network beyond the Access Server 101. Access Servers are also commonly referred to as Network Access Servers (NAS), Access Gateways, or Access Routers.

The Access Server 101 is a critical component in supporting network access control functions such as Authentication, Authorization, and Accounting (AAA). Authentication is a process whereby a network verifies the identity of a user 102 and sometimes a user also verifies the identity of the network. Authorization is a process whereby a network determines whether a user should be allowed to use a network or a network service. Accounting is a process whereby a network collects information on the resources used by a user.

In the prior art, when a user 102 wants to use a visiting network 100, it will first need to first acquire a local IP address from the access network 100 from the access server 101. The user terminal can acquire a local IP address in any way supported by the access network 100. A common approach is to use a standard IP auto-configuration protocol such as the Dynamic Host Configuration Protocol (DHCP) defined by the IETF. It will then have to perform user authentication with that network 100.

To perform user authentication, the user will need to use the protocols required by the network to communicate his/her authentication information (e.g., user identity, credentials and his request to use the network) to the network. Such authentication information is typically sent by the user 102 to an Access Server 101 in the network. Today, different networks may use different protocols and procedures for user authentication. For example, a World-Wide Web (WWW) browser can be used as the interface for a user to enter his/her authentication information, which can then be communicated to the network using the Hypertext Transfer Protocol (HTTP) or the Secure HTTP (S-HTTP) defined by the Internet Engineering Task Force (IETF). Alternatively, a user may use a link-layer protocol below the IP layer, such as the Point-to-Point Protocol (PPP), which has authentication packets to carry the authentication information to the network. The IETF PANA Working Group is working on a standard IP-layer protocol for carrying user authentication information between the user and a control entity (e.g., an Access Server) in the network.

Upon receiving a user's authentication information, an Access Server 101 will act as an AAA client to forward the user's authentication information to local AAA servers 103. The local AAA 103 servers will authenticate the user and return all the configuration information needed for the Access Server 101 to control network access. If the local AAA servers 103 do not have sufficient information to authenticate the user, they could forward the authentication requests to AAA servers 104 in the user's home network 105. An AAA server that forwards requests to remote servers is commonly referred to as an AAA Proxy.

Signaling between AAA client and AAA server can use any AAA protocol defined by the IETF. Today, RADIUS (Remote Authentication Dial In User Service) is the most widely deployed AAA protocol for this purpose. DIAMETER is a newer protocol defined by the IETF to overcome some of the limitations of RADIUS. Both RADIUS and DIAMETER are client/server protocols. When RADIUS is used for example, the Access Server will act as the RADIUS client and the AAA servers will act as RADIUS servers.

These existing methods belong to the "caller pay" model, in which a user who initiates the network connectivity pays for the use of the network. Accordingly, access by a user to a network will require an authorization process which may vary from network to network, and is time consuming and complicated to complete. There is a need in the art for a simply model for network access in an IP environment. In the telephony realm, Toll-free telephony has been globally successful over circuit-switched Public Switched Telephone Networks (PSTN) for providing a called party pay model that obviates the need for the calling party to have their call services authenticated or authorized. However, the concept of Toll-Free IP ("TIP") networks has not been well developed in the art. It is therefore an object of the present invention to provide for a system, method and architecture for a TIP network that obviates the need for the party initiating the communication session to follow a suite of procedures necessary to have their service request and network access authorized.

SUMMARY

The present invention is a new method, system and network architecture that enables a user to gain no-charge-to-user ("toll-free") access through an IP access network, Toll-Free IP (TIP). With TIP, a user who initiates the network connectivity does not pay for his/her use of the access network.

A key concept in our invention is a TIP destination. A TIP destination can be expressed in different forms, including toll-free IP addresses, toll-free Internet Domain Names, toll-free Universal Resource Identifiers (URI) or Universal Resource Locators (URL). To describe our invention, we use toll-free IP address as an illustrative example. However, the methods, systems and architecture described hereing also apply equally to other TIP destination systems.

In our invention an IP address is a toll-free IP address, or TIP address, if IP packets carrying this IP address as the destination IP address are allowed to pass through an access network without requiring the senders of the packets to be first authenticated by the access network or service provider.

Usage of an access network to communicate with a TIP address is paid by the TIP address owner, called a TIP owner, which is a company or individual that owns the IP addressing space including the TIP address. A user, without any prior arrangement with, and without having to be authenticated by, the access network or service provider, can send IP packets to a TIP address immediately after it establishes wireless or wired connectivity to the access network.

A TIP server, a functional entity, is used to maintain TIP address databases and to verify whether an IP address is a TIP address upon request. A TIP server can be centralized or distributed. A company that operates TIP servers is called a TIP administrator. A TIP administrator may also be a network or service provider or aggregator, an ISP, or even an enterprise network.

Unlike toll-free telephone numbers that have unique prefixes such as 800 or 888, any IP address can be made a TIP address by registering it as a TIP address with a TIP administrator. With the registration, the owner of the address agrees to pay, according to a policy, for the use of access networks to communicate with this TIP address. A TIP address can be an IP network prefix to allow toll-free access to any IP address inside the network identified by the TIP network prefix.

When an access network receives an IP packet with an unauthorized IP source or destination address, the access network sends a TIP Query message to a TIP server to query whether the destination IP address is a TIP address. Responses from the TIP Server are referred to as TIP Response messages. If the destination IP address is not a TIP address, the access network discards the packet. Then, the access network or the user may initiate conventional procedures to authenticate and authorize the user. If the destination address is a TIP address, the access network allows packets between the user and the TIP address to pass through without authenticating the user and his/her terminal.

TIP owners do not need direct business relationships with access network or service providers. TIP owners, and access network/service providers establish business relationships with TIP Administrators, which in turn broker network services with TIP owners' demands.

DETAILED DESCRIPTION

Figure 1:
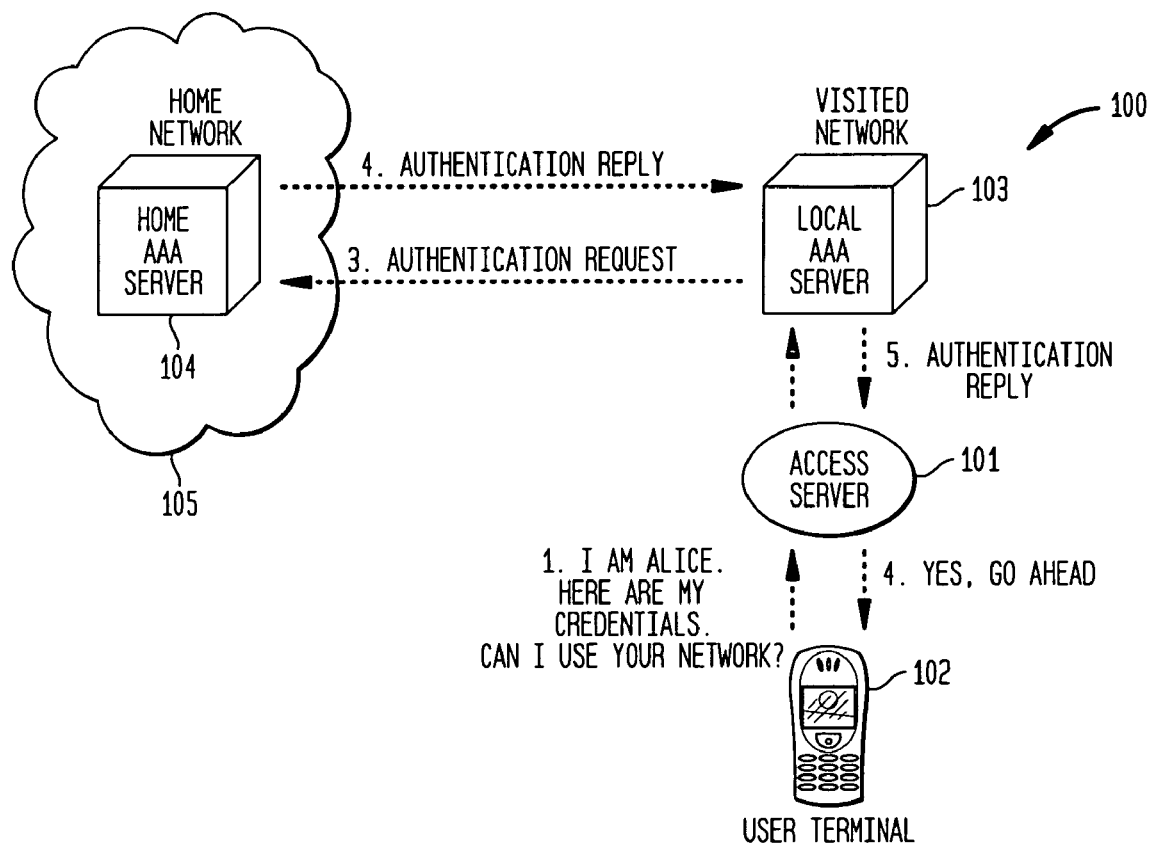
FIG. 1 is a depiction of a prior art IP network with access control.
Figure 2:
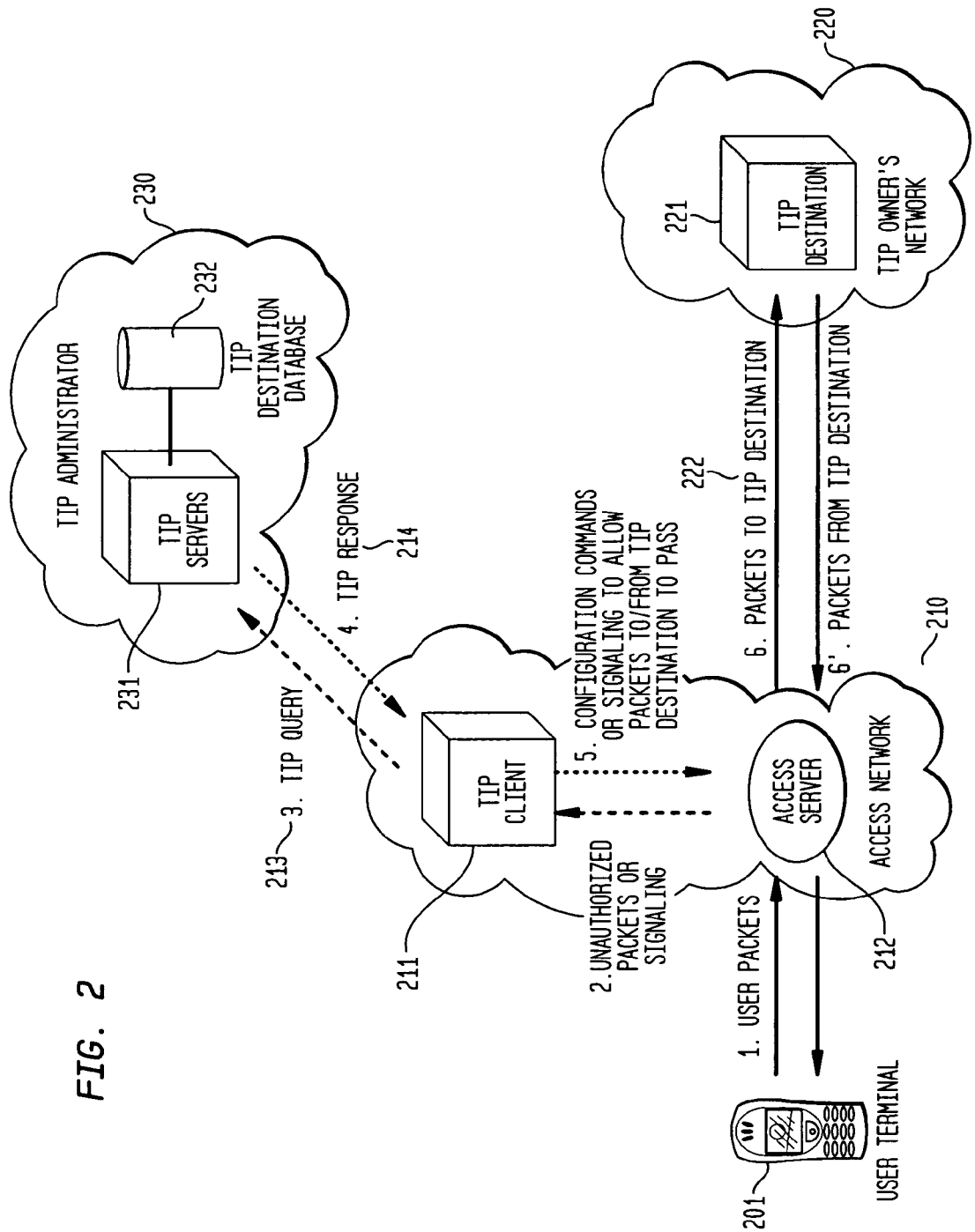
FIG. 2 is a depiction of one embodiment Toll-free IP network in accordance with our invention.

FIG. 2 illustrates a basic logical system architecture for supporting our invention. The basic components of a network implementing our invention are the access network 210, the TIP owner's network 220 and the TIP administer function 230. The key functions for implementing our inventive method in the network depicting in FIG. 2 are performed by the TIP administrator 230. The TIP administrator function 230 is be implemented on the following two main logical components: TIP Databases 232 and the TIP servers 231. The TIP databases 232 store the TIP destinations and their associated TIP policies. The TIP servers 231 are used to perform the main transaction processing needed by the TIP administrator to support TIP. These functions include: A) receiving and answering queries from access networks 210 on whether an IP destination is a TIP destination; B) providing TIP policy information to access networks 210, and C) interacting with TIP owner networks 220 to obtain TIP policies dynamically from the TIP owner networks. It could also be generate usage and billing records. Primarily, the TIP Servers 231 are the TIP administrator's interface with the access networks and with the TIP owner networks (when such interfaces are implemented). The TIP servers 231 may also be used to support other value-added services, such as directory services.

Within the access network, the functions needed to support TIP are implemented in the TIP Client. Specifically, a TIP client 211 has the following main functionality: A) to receive, from the access network 210, packets that are potentially destined to TIP destinations, B) to query TIP servers 231 to determine if a destination is a TIP destination, and C) to forward packets destined to TIP destinations toward the TIP destination 221. It also may maintain a temporary cache of TIP destinations learned from a TIP administrator to reduce the frequency of queries sent to TIP servers and it may maintain a local database of TIP destinations and TIP polices that is independent of any external TIP administrator.

Both the TIP client 211 and TIP server 231 are logical entities. They may be co-located or integrated with other network entities or implemented as new network entities separate from other network entities. TIP client 211 and TIP server 231 may also be implemented as an integrated entity. To increase system scalability and improve system performance, TIP databases 232 and TIP servers 231 may be implemented in a distributed fashion, potentially over multiple physical platforms in different geographical locations.

TIP servers 231 may also be implemented hierarchically. For example, regional TIP servers may be used to manage a subset of TIP destinations that are most relevant to that region. If a regional TIP server does not know if a destination is a TIP destination, it can then ask a TIP server at the next higher level in the TIP server hierarchy to help determine whether the destination is a TIP destination.

The basic operation of our invention is also illustrated in FIG. 2. When a user 201 first arrives at an IP access network 210, it acquires a local IP address to receive packets from this access network. A network can allocate IP addresses to a mobile terminal without authenticating the terminal or its user. IP address allocation can be supported using, for example, the Dynamic Host configuration Protocol (DHCP) defined by the Internet Engineering Task Force (IETF). After acquiring a local IP address, the user 201 can send its packets over the local access network 210 to TIP destination 221 without having to first go through any user-to-network authentication and authorization procedure with the access network or service provider.

An one embodiment of our invention a Policy Enforcement Point (PEP) 212 located with the IP access network 210 which determines how packets should be handled within the IP access network (e.g., allowed to traverse the access network, discarded, or forwarded to other network entities). Examples of PEPs in the current art include IP access servers, access gateways, access routers, security proxies, wireless access points, the Gateway GPRS Support Nodes (GGSN) in a GPRS (General Packet Radio Service) network or 3GPP (Third Generation Partnership Project) network, or the Packet Data Serving Nodes (PDSN) in a 3GPP2 (Third Generation Partnership Project 2) network. When a PEP 212 receives a packet from a user 201 and discovers that its source and/or destination IP addresses have not been authorized, the PEP 212 forwards the packet to a TIP Client 211. Alternatively, the PEP 212 may cache the packet and send a signaling packet to the TIP client 211. The TIP client 211, which can be collocated on the PEP 212 or implemented as a separate entity, will send a TIP Query message 213 to a TIP server 231 to check whether the destination address of the user packet is a TIP address.

If the TIP Response message 214 indicates that the IP address is a TIP address, the TIP client 211 instructs the PEP 212 to allow packets between the user's local address 201 and the TIP destination 221 to pass through. If the PEP 212 has packets destined to this TIP destination 221 still in its packet cache, it sends these packets into the network. From this point on, packets will flow directly between the user 212 and the TIP distination 221 without having to go through any TIP client 211 or TIP server 231.

A user may also use a TIP address to communicate with non-TIP destinations. There are two basic ways to accomplish this:

The first approach is for the user to use the TIP owner's network to communicate with non-TIP destinations. This is similar to remote dialup into the user's enterprise network or a public service provider network and then using that network to go to other destinations. For example, a security gateway in the service provider's network can be addressed by a TIP address. A user can use the TIP address to establish a tunnel (e.g., an IPsec tunnel) to the gateway and then use it to send and receive packets to and from any destination inside or outside the service provider's network.

The second approach is for the user to first use a TIP address to communicate with a service provider. The service provider authenticates the user and then authorizes, via the TIP administrator, the user's use of the access network to communicate with any or specified non-TIP destinations.

A TIP owner can dynamically control how its TIP destinations are accessed dynamically. These more sophisticated controls over how a TIP address can be accessed can be achieved using policy-based control mechanisms and can enable other value added services such as Prepaid IP or Collect IP services. A policy on how a TIP address should be accessed is called a TIP policy. For example, TIP policies may specify the amount of time a user can access a TIP address and the amount of money a TIP owner is willing to pay for the use of access networks to communicate with a TIP address within a given time period.

There are two basic ways to implement TIP policies: TIP administrator-driven approaches and TIP owner-driven approaches. With a TIP administrator-driven approach, the TIP administrator performs policy-based control without relying on dynamic information from the TIP owners. With a TIP owner-driven approach, the TIP owner supplies TIP policies dynamically.

Using TIP administrator-driven policy-based control, a TIP owner and the TIP administrator agrees on a TIP policy, which is then configured at the TIP administrator's databases. The TIP administrator uses the information in its databases to answer TIP Query messages and instruct the access network on how to handle packets destined to a TIP address. Such pre-configured TIP policies may be used, for example, when they can be applied to any user uniformly.

TIP owner-driven policy control gives a TIP owner more control over how its TIP address is accessed. For example, an enterprise network may only allow its employees to use a TIP address to access its networks. An Internet service or application provider may want to use a TIP address to allow only its paying subscribers to access its networks and services. In these cases, a TIP address may identify a gateway in the TIP owner's network. Such a gateway may be, for example, a firewall or an AAA server. The TIP address will allow a user to pass through an access network to communicate with the gateway, which will authenticate the user to determine whether to allow his/her traffic to enter the TIP owner's intranets. The TIP owner can then instruct the TIP administrator dynamically on how to handle the traffic of an authorized user and reject traffic from an unauthorized user. A TIP owner can do so by issuing an Authorization Ticket, which contains TIP policy information needed by the TIP administrator and the IP access networks to control access to the TIP address for a specific user based on the result of the user authentication and authorization.

Figure 3:
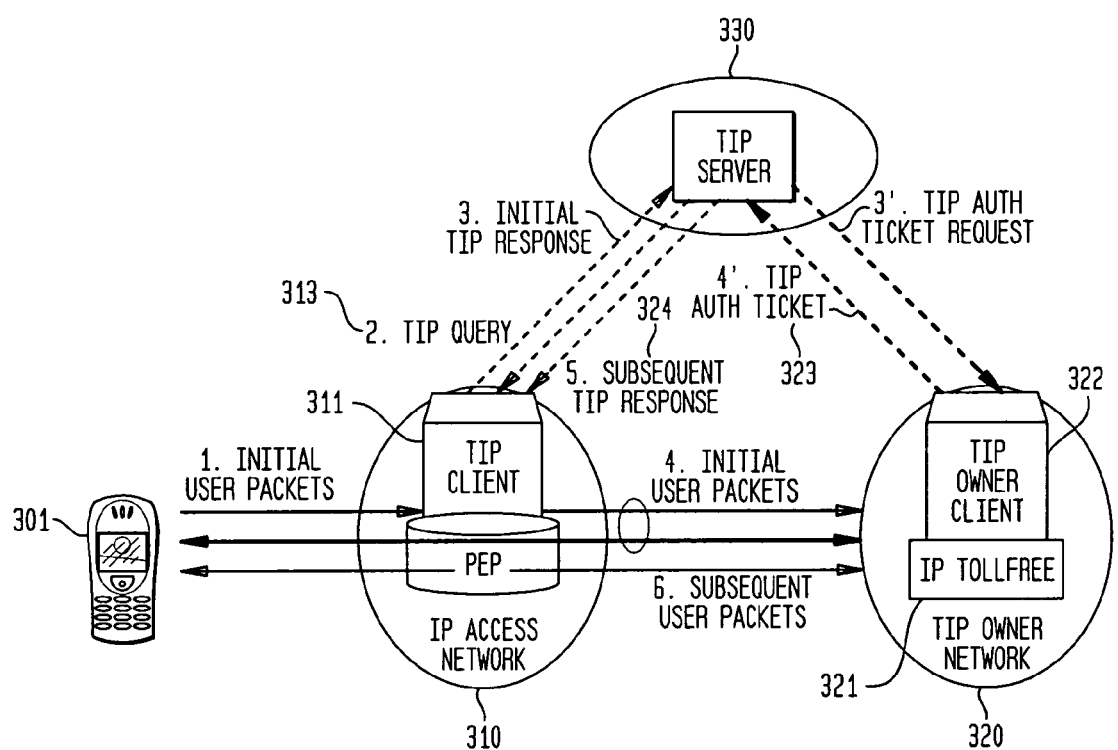
FIG. 3 is a depiction of a second embodiment or our Toll-free IP network with dynamic assisted control.

The basic operation of our invention in an embodiment using Authorization Tickets is illustrated in FIG. 3. When the TIP administrator 330 receives a TIP Query message 313 from an access network, it responds first with an initial TIP Response message 314 to authorize network access for a pre-determined temporary and short free access time (e.g., time for the user to be authenticated by the TIP owner) and to inform the TIP client 311 to wait for further TIP Response messages. Simultaneously, the TIP Administrator 330 asks the TIP owner 320 for an Authorization Ticket for the user 301. The user 301 gains free access through the access network 310 to the TIP destination 321 during the temporary free access time. Once the user 301 gets in touch with the TIP owner 320, the TIP owner 320 authenticates the user 301. Upon positive authentication, a TIP Owner Client 322 in the TIP owner network 320 issues an Authorization Ticket 323, which carries the TIP policy information, to the TIP Administrator 310. The TIP Administrator 310 forwards the TIP policy information in the Authorization Ticket to the access network 310 in the TIP Response messages 324. The TIP client 311 in the access network provider's network records the TIP policy information from the TIP Administrator 330 and uses it to determine how the user's 301 traffic should be handled inside the access network 310. To prevent malicious use of the network, the access network blocks the user's packet flow if the authorization expires. The TIP system does not impose any restriction on how a TIP owner processes the packets delivered to a TIP destination. For example, an enterprise network may use its firewall and virtual private network procedures and protocols to authenticate a user.

Protocol Implementations

To support our TIP invention, a signaling protocol for the interface between TIP client and TIP server is needed. A signaling protocol between TIP server and TIP owner network is also needed to support dynamic TIP owner-driven policy control. These signaling protocols are used primarily for authentication and authorization purposes. One such protocol is known in the art as the Diameter Base Protocol (P. Calhoun, "Diameter Base Protocol" IETF RFC 3588, September 2003) and can be used as the baseline protocol for signaling over these interfaces. Diameter is envisioned to be the future AAA protocol in IP networks. To use Diameter to support a service, a Diameter application needs to be developed for the Toll-Free service.

Our invention includes the use of a Diameter TIP Access Network Application (TANA) that runs on the TIP client and on the TIP server with the TIP client 18 acting as the Diameter client and the TIP server as the Diameter server.

Figure 4:
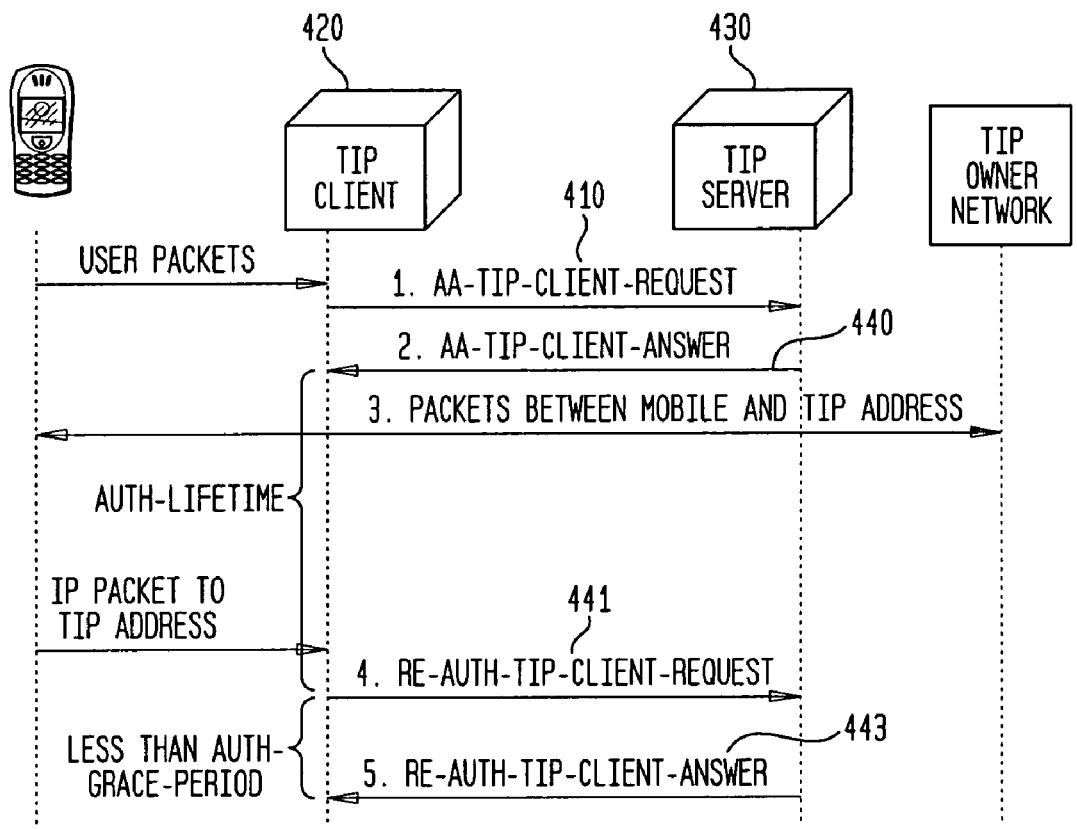
FIG. 4 is illustrates as sample signaling flow in accordance with one embodiment of our invention.

FIG. 4 illustrates a sample signaling flow of the TANA. Diameter uses a request and answer model in which a Diameter client sends request messages to a Diameter server that will reply with answer messages. TANA uses the following new request messages. First, AA-TIP-client-Request 410 is a request sent by TIP client 420 to TIP server 430 to query if an IP address is a TIP address and to obtain TIP policy information. This message is an example of the "TIP Query" message in FIG. 4. Second, AA-TIP-client-Answer 440 is an answer sent by TIP server 430 to TIP client 420 in response to an AA-TIP-client-Request 410. This message is an example of the "TIP Response" message shown in FIG. 4. Third, Re-Auth-TIP-Client-Request 441 is a request sent by TIP client 420 to TIP server 430 to request for permission to extend the lifetime of an authorization for a TIP address and to update other authorization parameters. Finally, Re-Auth-TIP-Client-Answer 443 is an answer sent by TIP server 430 to TIP client 420 in response to a Re-Auth-TIP-Client-Request 410.

<AA-TIP-client-Request>::=<Diameter Heather><Session-Id>{Auth-Application-Id} {Origin-Host} {Origin-Realm} {Destination-Realm} {Auth-Request-Type} {MH-IP-Address} {Access-Network} {Target-IP-Address}

Each <*> indicates a fixed Attribute Value Pair (AVP) that must be present and has a fixed position in the message, each {*} indicates a required AVP that must be present and can appear anywhere in the message, and each [*] indicates an optional AVP that may appear anywhere in the message. The Diameter Heather contains information used to distinguish different Diameter messages.

The attributes are used to support TIP and the other attributes are standard Diameter attributes. Auth-Request-Type is a standard Diameter attribute with one standard Diameter attribute value AUTHORIE_ONLY, for the TIP application. MH-IP-Address is a new attribute used to carry the source IP address of the mobile for which the Diameter session is to be established. Access-Network is a new attribute used to carry the identifier of the access network. Target-IP-Address is a new attribute that carries the IP address to be checked by the TIP server to see if it is a TIP address.

After processing an AA-TIP-client-Request, the TIP server returns an AA-TIP-client-Answer to inform the TIP client of the results of the AA-TIP-client-Request and what further processing, if any, needs to be taken by the TIP client. The AA-TIP-client-Answer contains all the attributes required by the Diameter Base Protocol plus new attributes that are needed to support TIP. A sample message format is as follows:

<AA-TIP-client-Answer>::=<Diameter Heather><Session-Id>{Auth-Application-Id} {Auth-Request-Type} {Result-Code} {Origin-Host} {Origin-Realm} [Auth-Grace-Period] [Authorizafion-Lifetime] [Target-IP-Address] [TIP-Network-Prefix] [Session-Timeout] [Error Message] [Failed-AVP]

AA-TIP-client-Answer uses a Result-Code to tell the TIP client of the result of its AA-TIP-client-Request and any further actions the TIP client should take. Some times, the TIP server may not have all the necessary TIP policy information when it receives an AA-TIP-client-Request. This may occur, for example, when the TIP server needs to get Authorization Tickets from the TIP owner dynamically. In such cases, the TIP server answers the AA-TIP-client-Request immediately with an AA-TIP-client-Answer that carries a special Result-Code value to tell the TIP client that the target IP address is a TIP address, but the TIP client should expect further TIP policy information. The following are sample values of the Result-Code in an AA-TIP-client-Answer:

2001 DIAMETER_SUCCESS: The IP address is a TIP address and the access network should allow the user's traffic to go through according to the TIP policy attributes in the answer message. The TIP policy attributes in the sample message format include (other attributes may be added): 1) Authorization-Lifetime: A standard Diameter attribute carrying the period of time toll-free access to the target IP address is authorized, 2) Auth-Grace-Period: A standard Diameter attribute used to carry the extra period of time, beyond the Authorization-Lifetime, that can be used by the access network to gain extension to the Authorization-Lifetime, 3) Target-IP-Address: A new attribute used to carry the Target-IP-Address copied from the Target-IP-Address attribute in the corresponding AA-TIP-client-Request message, and 4) TIP-Network-Prefix: A new attribute used to carry the network prefix that specifies a TIP network prefix in the TIP owner network.

2002 DIAMETER_LIMITED_SUCCESS: The target IP address is a TIP address and the access network should allow the user's packets to pass through for a limited time as specified in the Authorization-Lifetime attribute plus the time specified in the Auth-Grace-Period. The TIP client should expect new TIP policy information from the TIP server.

5003 DIAMETER_AUTHENTICATION_REJECTED: The target IP address is not a TIP address. The AA-TIP-client-Answer message also carries a text Error-Message "IP address is not a TIP address" to provide the specific reason that caused the TIP Administrator to reject the AA-TIP-client-Request message.

If the user continues to send packets to the TIP address immediately after the Authorization-Lifetime expires, the TIP client will send a Re-Auth-TIP-Client-Request message to the TIP server to request the TIP server to extend the Authorization-Lifetime. This message has the same format and contains the same attributes and attribute values as the AA-TIP-Client-Request message with the following exception: the Auth-Request-Type attribute is replaced with a Re-Auth-Request-Type attribute. The value of the Re-Auth-Request-Type attribute is set to AUTHORIZE_ONLY. The Result-Code in the answer message to the Re-Auth-TIP-Client-Request can only be "2001" or "5003". The TIP client or server can terminate a Diameter session by sending a Session-Termination-Request message to the other end of the session.

Figure 5:
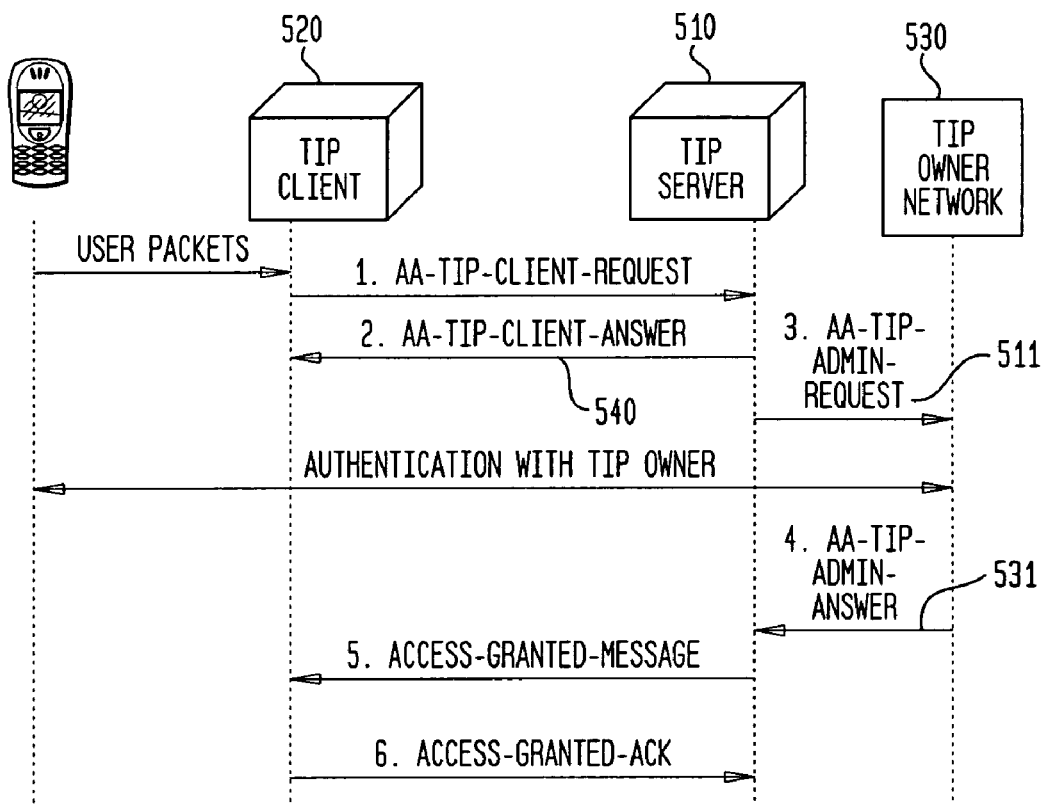
FIG. 5 is a second illustrative signaling flow in accordance with another embodiment of our invention.

In another embodiment of our invention, we define a Diameter TIP Owner Application. In this embodiment a TIP server uses the Diameter TIP Owner Application (TOA) to retrieve TIP policy information dynamically from a TIP owner. The TIP server will act as a Diameter client and TIP owner network will act as a Diameter server. FIG. 5 shows a sample signaling flow when both TANA and TOA are used to authorize access to a TIP address. The TIP server 510 initiates a Diameter session with the TIP owner 530 network by sending an AA-TIP-admin-Request message 511 to the TIP owner network 530. This request contains all the attributes required by the Diameter Base Protocol plus new attributes used to support TIP operations. A sample format of the AA-TIP-admin-Request message is as follows:
<AA-TIP-admin-Request>::=<Diameter Heather><Session-Id>{Auth-Application-Id} {Origin-Host} {Origin-Realm} {Destination-Host} {Destination-Realm} {Auth-Request-Type} {MH-IP-Address} {Access-Network}

Upon receiving the AA-TIP-admin-Request message 511, the TIP owner network 530 checks if any user with source address "MH-IP-Address" has been authorized. If the answer is yes, the TIP owner network 530 waits to see if any such user will appear during an Authorization-Timeout period. Upon detecting such a user or upon expiration of the Authorization-Timeout period, the TIP owner network 530 will return an AA-TIP-admin-Answer message 531 to the TIP server 510. This message will contain the result of the AA-TIP-admin-Request message 511 and the TIP policy for this particular user. A sample format of the AA-TIP-admin-Answer is as follows:
<AA-TIP-admin-Answer>::=<Diameter Heather><Session-Id>{Auth-Application-Id} {Auth-Request-Type} {Result-Code} {Origin-Host} {Origin-Realm} [Authorization-Lifetime] [Auth-Grace-Period] [Target-IP-Address]
[TIP-Network-Prefix]
[Session-Timeout] [Error-Message]
Sample values of the Result-Code include:
1) 2001 DIAMETER_SUCCESS: The user is authorized and its access to the TIP address should be controlled based on the TIP policy attributes in the AA-TIP-admin-Answer message; and
2) 5004 DIAMETER_AUTHENTICATION_REJECTED: Rejected by TIP owner or authorization failure.

To support TIP Authorization Tickets, the following two additional messages also need to be added to TANA. First, upon receiving an AA-TIP-admin-Answer message, the TIP server sends an Access-Granted-Message to provide the additional TIP policy information to the TIP client in the access network. A sample format of the Access-Granted-Message is as follows:
<Access-Granted-Message>::=<Diameter Heather><Session-Id>{Auth-Application-Id} {Origin-Host} {OriginRealm} {Destination-Host} {Destination-Realm} [Auth-Grace-Period] [Authorization-Lifetime]
{MH-IP-Address} {Access-Network} {Target-Destination} [TIP-Network-Prefix] [Session-Timeout]

Second, the TIP client replies to the Access-Granted-Message with an Access-Granted-Ack message. A sample format of the Access-Granted-Ack message is as follows:
<Access-Granted-Ack>::=<Diameter Heather><Session-Id>{Auth-Application-Id} {Result-Code} {Origin-Host} {Origin-Realm} [Error-Message] [Failed-AVP]

The Access-Granted-Ack message carries a Result-Code value 2001 if the Access-Granted-Message is successfully processed. If any error occurred when processing the Access-Granted-Message, the Access-Granted-Ack message will carry a Result-Code value to indicate the error. The Error-Message and the Failed-AVP fields may also contain additional error messages.

The foregoing detailed description discloses a method and architecture for provided Toll-free IP networks services and describes proposed enabling protocols. The above described embodiments of the invention oare intended to be illustrative only. Numerous alternative embodiments may be devised by those skilled in the art without departing from the spirit and scope of the following claims. As an example, the invention described herein could be used to support other new value-added services over IP-based access networks. Such other services could include but are not limited to the following:

Selective Charging: With Selective Charging, charging is only incurred when a user communicates with a selected set of destinations. Such destinations, for example, may provide value-added contents or services. The use of the networks to communicate with this selected set of destinations may be paid by these destinations. Users may be allowed to use the network to communicate with other destinations for free. Selective Charging may also be used with the "caller-pay" models. In such a case, a user will be charged only when he/she communicates with any destination in a selected destination set. The user may use the access network to communicate with other destinations for free.

Pre-Paid IP: A user may first use TIP to gain free access to a Prepaid IP Service Provider that may be independent of the access network operators. The Prepaid IP Service Provider authenticates the user, verifies his/her pre-paid account and then authorizes the access network to allow the user to use the access network for a given time period. During this authorized time, the user may also be authorized to communicate with non-TIP destinations. With TIP, the Prepaid IP Service Provider does not necessarily have to interact with the access networks directly in order to authorize a user's use of the access networks.

Collect IP Call: A user may first use TIP to gain free access to a Collect IP Call Service Provider that may be independent of the access network operators. Then, the Collect IP Call Service Provider either forwards the user traffic to the final destination or authorizes the access network to allow the user to connect to the final destination directly, provided that the final destination agrees to pay for the connection. With TIP, the service provider does not necessarily have to interact with the access networks directly in order to authorize a user's use of the access networks.

TIP allows a content provider (e.g., an online merchant) to offer a convenient way for everyone to access its WWW sites free.

Our invention can be used to support seamless roaming across hotspots of different operators/aggregators and across hotspots and cellular networks, by eliminating the need for a roaming user or terminal to handle the heterogeneous user-to-network authorization protocols and the heterogeneous charging plans used by different operators/aggregators. With TIP, a user will not have to be concerned with roaming charges or the varying pricing plans of different access network operators.

Our invention could potentially reduce the cost of high-speed access for business travelers. Today, a business traveler typically pays a daily fee for Internet access at hotels. TIP allows the travelers to incur costs to their corporations only when they use the network.

We claim:

1. An internet protocol network toll-free network access comprising: a toll-free client associated with an access network; a toll-free server associated with said toll-free client wherein said server in response to a query from said client identifies to said toll-free client an IP address as a toll-free destination without requiring a user to be authenticated by the access network.

2. The network of claim 1 wherein said toll-free server further comprises a toll-free IP destination database containing information on IP destinations wherein the IP destination owner would be billed for any packets sent to said IP destination.

3. The network of claim 2 wherein said access network further comprises: an access server for coordinating a users access to a local IP network; and wherein said access server uses said toll-free client to query said toll-free server to determine if an IP address contained in a packet from a user is a toll-free address.

4. The network of claim 1 further comprising a second toll-free client application associated with said toll-free destination network wherein said second toll-free client application stores policies governing which users at said access network can connect to said IP destination network.

5. The network of claim 4 wherein said toll-free server further comprises a means to request and receive said stored policies from said second toll-free client application.

6. The network of claim 5 wherein said toll-free server further comprises a means to send said policies received from said second toll-free client application to said toll-free client associated with said access network and wherein said toll-free client associated with said access network further comprises a means to use said polices to control a users access to said toll-free destination network.

7. A method for providing toll-free access to an IP based network comprising the steps of:
determining whether a packet received from a user attempting to access an access network contains an address that has been identified as a toll-free destination; and if said address is a toll-free destination sending and receiving said user packets to and from said identified toll-free destination without requiring a user to be authenticated by the access network.

8. A method for providing toll-free access to an IP based network comprising the steps of:
determining whether a packet received from a user attempting to access an access network contains an address that has been identified as a toll-free destination; and if said address is a toll-free destination sending and receiving said user packets to and from said identified toll-free destination without requiring a user to be authenticated by the access network wherein said step of determining comprises the steps of: sending a query containing an IP address from a user packet from a client application associated with said access network to a toll-free server; checking at said toll-free server responsive to said query to see of said IP address is a toll-free destination; sending a response message from said toll-free server back to said client application associated with said access network wherein said response message would indicate whether said IP address is a toll-free destination; and if said response message indicated that said IP address is a toll-free destination, forwarding all subsequent packets from said user through said access network to said toll-free destination.

9. The method of claim 8 wherein said method further includes the step of: obtaining policy information from a toll-free client application at said toll-free destination owners network.

10. The method of claim 9 further comprising the steps of sending said policy information to said access network and executing at said access network said policies to control a users communications to said destination network.

11. The method of claim 9, wherein said policy information includes an allowed access time for a user to access a toll-free destination and wherein said method further includes the steps of:
authenticating a user;
verifying a time remaining in the allowed access time for the user; and
forwarding all subsequent packets from the user through the access network to the toll-free destination based upon said verification.

12. A server for providing toll-free access administration comprising: means for storing toll-free access information in a database wherein said means for storing is logically situated separately from an access network; means for determining whether an IP packet received at said access network contains a toll-free destination address, without requiring a user that transmitted the IP packet to be authenticated by the access network; and means for sending message from said server to said access network to notify said access network when said IP packet contains a toll-free destination address.

13. The server of claim 12 further comprising: means for accessing a client application located at said toll free destination network for querying whether toll-free access for said IP packet received at said access network is a toll-free destination.

14. The server of claim 13 wherein said means for accessing further comprising a means for forwarding information received from said client application to a client application located at said access network.

15. The server of claim 14 wherein said means for accessing further comprises a means for accessing policy information from said client application at said toll-free destination network.

* * * * *

UNITED STATES PATENT AND TRADEMARK OFFICE
CERTIFICATE OF CORRECTION

| | | |
|---|---|---|
| PATENT NO. | : 7,848,312 B2 | |
| APPLICATION NO. | : 11/007868 | |
| DATED | : December 7, 2010 | |
| INVENTOR(S) | : Zhang et al. | |

It is certified that error appears in the above-identified patent and that said Letters Patent is hereby corrected as shown below:

In the Specification

In Column 1, Line 43, delete "providers'" and insert -- providers --, therefor.

In Column 3, Line 30, delete "hereing" and insert -- herein --, therefor.

In Column 4, Line 9, delete "owners'" and insert -- owners --, therefor.

In Column 4, Line 22, delete "invention;" and insert -- invention. --, therefor.

In Column 5, Lines 50-51, delete "user 212 and the TIP distination" and insert -- user 210 and the TIP destination --, therefor.

In Column 5, Line 58, delete "dialup" and insert -- dial up --, therefor.

In Column 7, Line 65, delete "AUTHORIE_ONLY," and insert -- AUTHORIZE_ONLY, --, therefor.

In Column 8, Line 16, delete "[Authorizafion-Lifetime]" and insert -- [Authorization-Lifetime] --, therefor.

In Column 8, Line 21, delete "Some times," and insert -- Sometimes, --, therefor.

In Column 10, Line 19, delete "oare" and insert -- are --, therefor.

Signed and Sealed this
Twenty-first Day of October, 2014

Michelle K. Lee
*Deputy Director of the United States Patent and Trademark Office*